(12) United States Patent
Claggett et al.

(10) Patent No.: US 9,960,987 B2
(45) Date of Patent: May 1, 2018

(54) SYSTEM AND METHOD FOR USING OPEN SOURCE MANAGEMENT MODULES ON HARDWARE SWITCH ELEMENTS

(71) Applicant: Dell Products, LP, Round Rock, TX (US)

(72) Inventors: Charles B. Claggett, Coupland, TX (US); Lee E. Ballard, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 83 days.

(21) Appl. No.: 14/842,801

(22) Filed: Sep. 1, 2015

(65) Prior Publication Data
US 2017/0063661 A1    Mar. 2, 2017

(51) Int. Cl.
| H04L 12/50 | (2006.01) |
| H04L 12/26 | (2006.01) |
| H04L 12/24 | (2006.01) |
| H04L 12/935 | (2013.01) |

(52) U.S. Cl.
CPC .............. *H04L 43/10* (2013.01); *H04L 41/14* (2013.01); *H04L 43/18* (2013.01); *H04L 49/3009* (2013.01)

(58) Field of Classification Search
CPC ................. H04L 12/56; H04L 12/5689; H04L 2012/5617
USPC .......................... 370/357, 360, 389, 392, 431
See application file for complete search history.

(56) References Cited

U.S. PATENT DOCUMENTS

| 6,175,868 | B1 | 1/2001 | Lavian et al. | |
| 6,907,469 | B1 | 6/2005 | Gallo et al. | |
| 7,817,637 | B2* | 10/2010 | Kitani | H04L 12/4633 370/392 |
| 7,920,567 | B2* | 4/2011 | Seto | H04L 12/4641 370/392 |
| 7,983,257 | B2* | 7/2011 | Chavan | H04L 12/467 370/389 |
| 8,416,796 | B2* | 4/2013 | Forster | H04L 41/0806 370/392 |
| 8,798,056 | B2* | 8/2014 | Ganga | G06F 15/16 370/392 |
| 8,798,064 | B2* | 8/2014 | Agarwal | H04L 49/70 370/392 |
| 2006/0114915 | A1 | 6/2006 | Kalkunte et al. | |
| 2006/0285499 | A1 | 12/2006 | Tzeng | |

(Continued)

OTHER PUBLICATIONS

Pirko, Jiri, "Linux Rocker Switch Driver: Rocker Switch Driver with Hardware Accelerated Datapath API—Phase 1: Bridge FDB Offload," Nov. 6, 2014; LWN.net Weekly Edition for May 29, 2015. https://lwn.net/Articles/619446/.

(Continued)

*Primary Examiner* — Dmitry H Levitan
(74) *Attorney, Agent, or Firm* — Larson Newman, LLP (57) ABSTRACT

Embodiments allow open source software code and modules to be used in a proprietary switch system including a switch chip operating in conjunction with a processor to provide management functionality for the switch system. One or more modules provide an interface between the switch chip and open source software elements, allowing open source code to be used in the switch system to provide network management functionality.

20 Claims, 9 Drawing Sheets

(56) References Cited

U.S. PATENT DOCUMENTS

2015/0271103 A1* 9/2015 Thayalan ................ H04L 49/25
370/217

OTHER PUBLICATIONS

Milecki, Rafal, "Switchdev Driver for Broadcom BCM53xx Switches: Net: Phy: B53: Switchdev Driver for Broadcom BCM53xx Switches," Feb. 24, 2015, LWN.net Weekly Edition. https://lwn.net/Articles/634787/.

* cited by examiner

SYSTEM AND METHOD FOR USING OPEN SOURCE MANAGEMENT MODULES ON HARDWARE SWITCH ELEMENTS

FIELD OF THE DISCLOSURE

The present disclosure generally relates to implementing communication management functions, and more particularly to systems and methods for using open source modules with switch elements.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

For example there has been a proliferation of lower functionality switches such as Ethernet switch chips, deployed in networks for enabling network communication. These lower functionality switches, which are often low cost, may be limited with regard to management functionality such as link layer discovery protocol(s), spanning tree functionality, or other management functionality.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As discussed above, there has been a proliferation of lower functionality switches, for example, Ethernet switch chips, deployed in networks for network communication. These lower functionality switches, which are often low cost, may be limited with regard to enabled management functionality such as link layer discovery protocol(s), spanning tree functionality, or other management functionality such as network management functionality. Such switch chips are often found in home wireless routers and other products not targeted at network infrastructure. These switch chips may have functionality that allows for implementing management functionality, but implementation of the functionality may require vendor software running on a management processor. The cost of the management processor and vendor software may be more costly than the (low cost) switch chip, raising the cost of a switch chip device.

Furthermore, in certain configurations of switching elements such as switch chips, open source software may not naturally interoperate with the configuration of the switching elements. For example, open source management software is generally written presuming a direct connection to a port, whereas in certain configurations of switching elements, a set of switch ports interfaces with management software via an intermediate port, causing a disjoint between the management software and port(s), creating a barrier to using open source management software with the set of switch ports to implement management functionality. Link layer discovery protocol (LLDP) and spanning tree functionality may require a correct port to packet correspondence in which information associating a packet with a switch port is provided, and an intermediate port disrupts port to packet correspondence. LLDP and spanning tree protocol (STP) may be defined by IEEE 802.1AB and IEEE 802.1D standards.

To overcome or supplement the limited management functionality of a (low cost) switch element, the switch element may be used in conjunction with a processor component. The processor component may operate with the switch element and configure the switch element; furthermore, the processor component may realize management functionality in conjunction with the switch element. For example, the processor component may virtualize ports of the switch element, and these virtual ports may be used by software elements, including open source software elements, to provide management functionality such as LLDP and spanning tree functionality. More particularly, LLDP and spanning tree algorithms are implemented with regard to virtual ports instantiated on the processor component. Using virtual ports instantiated on the processor element allows for maintaining packet to port correspondence and identifying potential network loops.

As discussed above, for some management functionality such as LLDP and spanning tree algorithms, it is necessary to correlate a received packet with the switch port the packet arrived on. When a switch processor system such as described above is used, incoming and outgoing packets communicated with the processor are tagged with an indication of the port associated with the respective packet. The tagging may further include a frame check sequence (FCS) of the respective packet. The FCS may indicate the length of the packet before tagging. The taggings of the packets are used by a subroutine running on the processor to route the packets to virtual ports instantiated on the processor which may operate with one or more open source program modules, for example, a Linux bridge driver, to provide management functionality.

Figure 1:
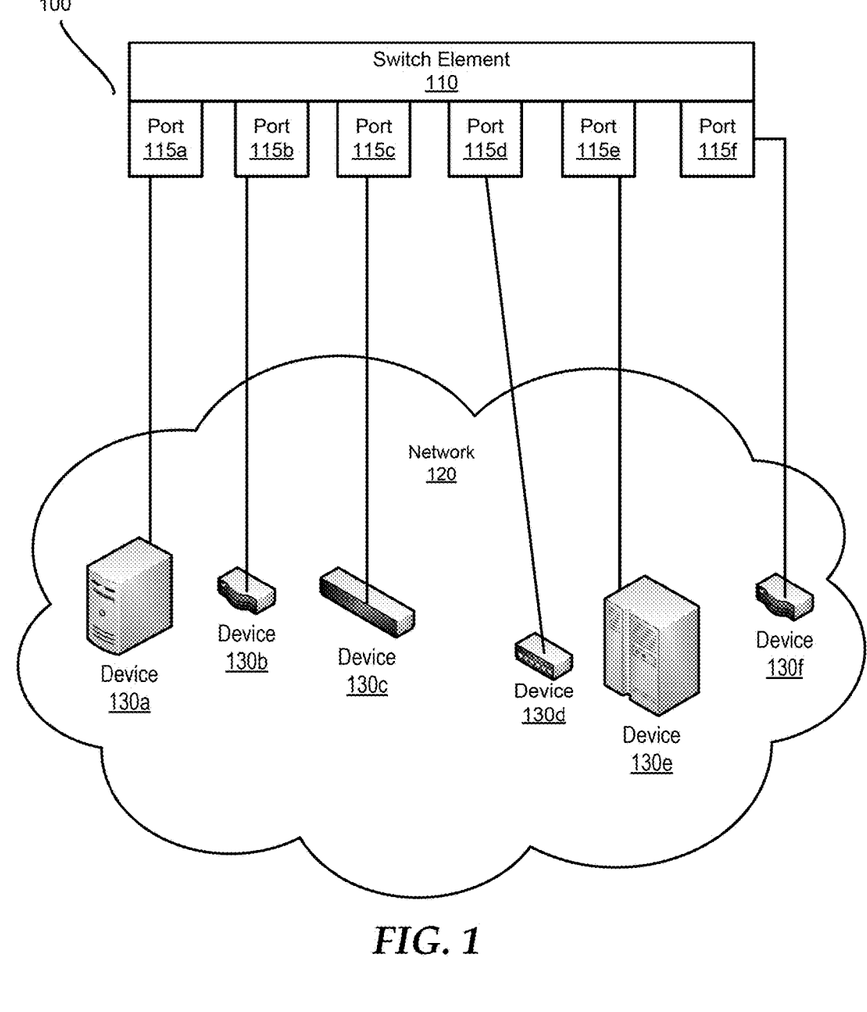
FIG. 1 is a block diagram illustrating a network, according to an embodiment of the present disclosure.

FIG. 1 illustrates a generalized embodiment of network communication system 100. Network communication system 100 comprises switch element 110 coupled to devices 130a-130f in network 120 via ports 115a-115f. More specifically, switch element 110 includes ports 115a-115f, and each port 115 is in communication with a respective device 130 of network 120. Devices 130 can be network devices, such as servers, switches, routers, mainframes, hubs, or other network devices, for example.

Figure 2A:
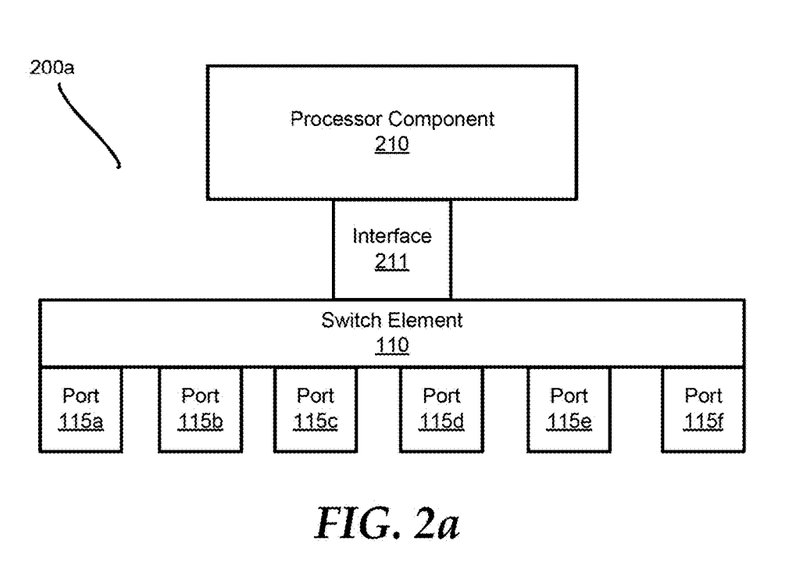
FIG. 2a is a block diagram of a switch element operating in conjunction with a processor component, according to an embodiment of the present disclosure.

FIG. 2a illustrates an embodiment of a processor switch system 200a. As shown, processor switch system 200a includes processor component 210 coupled to the switch element 110 of FIG. 1, which includes ports 115a-115f. Processor component 210 is coupled to switch element 110 via interface 211. Interface 211 may include a Media Independent Interface (MII) and a Serial Management Interface (SMI), for example, allowing for communication between processor component 210 and switch element 110. For example, packets and other data may be communicated between processor component 210 and switch element 110 using MII, and configuration and status communications may be communicated between processor component 210 and switch element 110 using SMI. Thus, packets received on ports 115a-115f may be tagged with the associated receiving port 115 by switch element 110 and forwarded to processor component 210 via MII over interface 211. Processor component 210 may operate in conjunction with switch element 110 to provide management functionality for system 200. While MII and SMI are explicitly mentioned above, other interface protocols may be used.

Figure 2B:
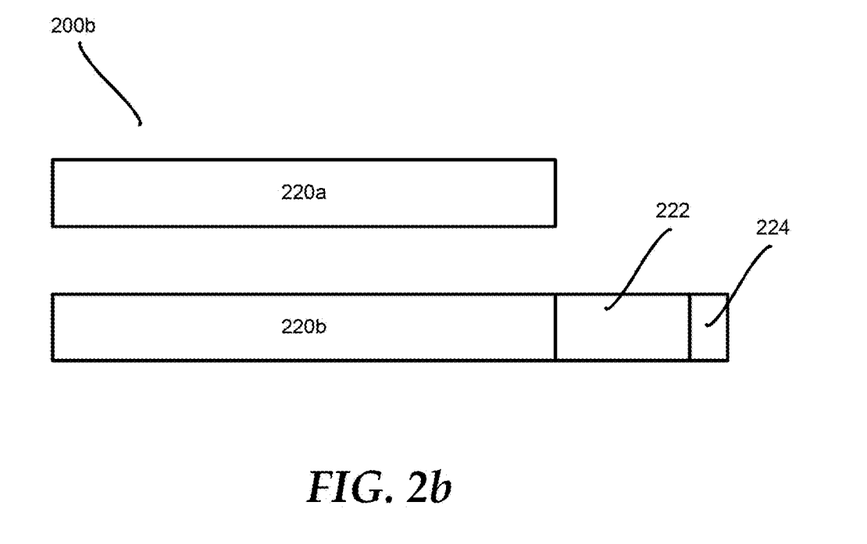
FIG. 2b is diagrammatic illustration of packets, according to an embodiment of the present disclosure.

FIG. 2b illustrates embodiments of packets 200b. Packet 220a is an untagged packet. Packet 220b is tagged packet based on packet 220a with a port indication 222 and FCS 224 appended to packet 220a to produce packet 220b, which, as can be seen from FIG. 2b, is longer than packet 220a due to the appending of port indication 222 and FCS 224. Port indication 222 indicates the port the packet was received on, for example, one of ports 115a-115f of FIG. 2a.

While FIG. 2b illustrates appending a tag to a packet to effectuate tagging, other types of tagging may be implemented. For example, a packet may have an internal set of bytes allocated for tagging data, or instead of being appended to the end of a packet, a tag can be inserted into a packet, for example, into the body of a packet. Thus a packet may be invasively or non-invasively tagged.

Figure 3:
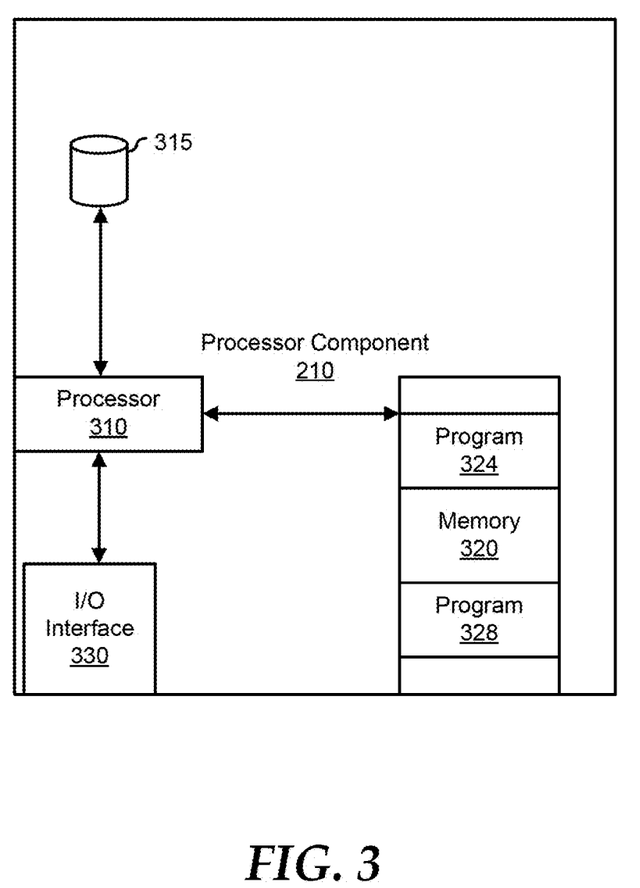
FIG. 3 is a block diagram of a processor component, according to an embodiment of the present disclosure.

FIG. 3 illustrates an embodiment of processor component 210 of processor switch system 200. Processor component 210 includes processor 310, hard disk device 315, memory 320, and Input/Output (I/O) interface 330. Processor 310 is a processor such as a CPU and is connected to hard disk 315 to access data and programs stored thereon. Processor 310 is also coupled to memory 320 to access data and programs stored thereon, for example, programs 324 and 328. Programs 324 and 328 may be executed by processor 310 to configure a switch device or to communicate packets. Processor 310 is further coupled to I/O interface 330 for packet and data communication.

Figure 4:
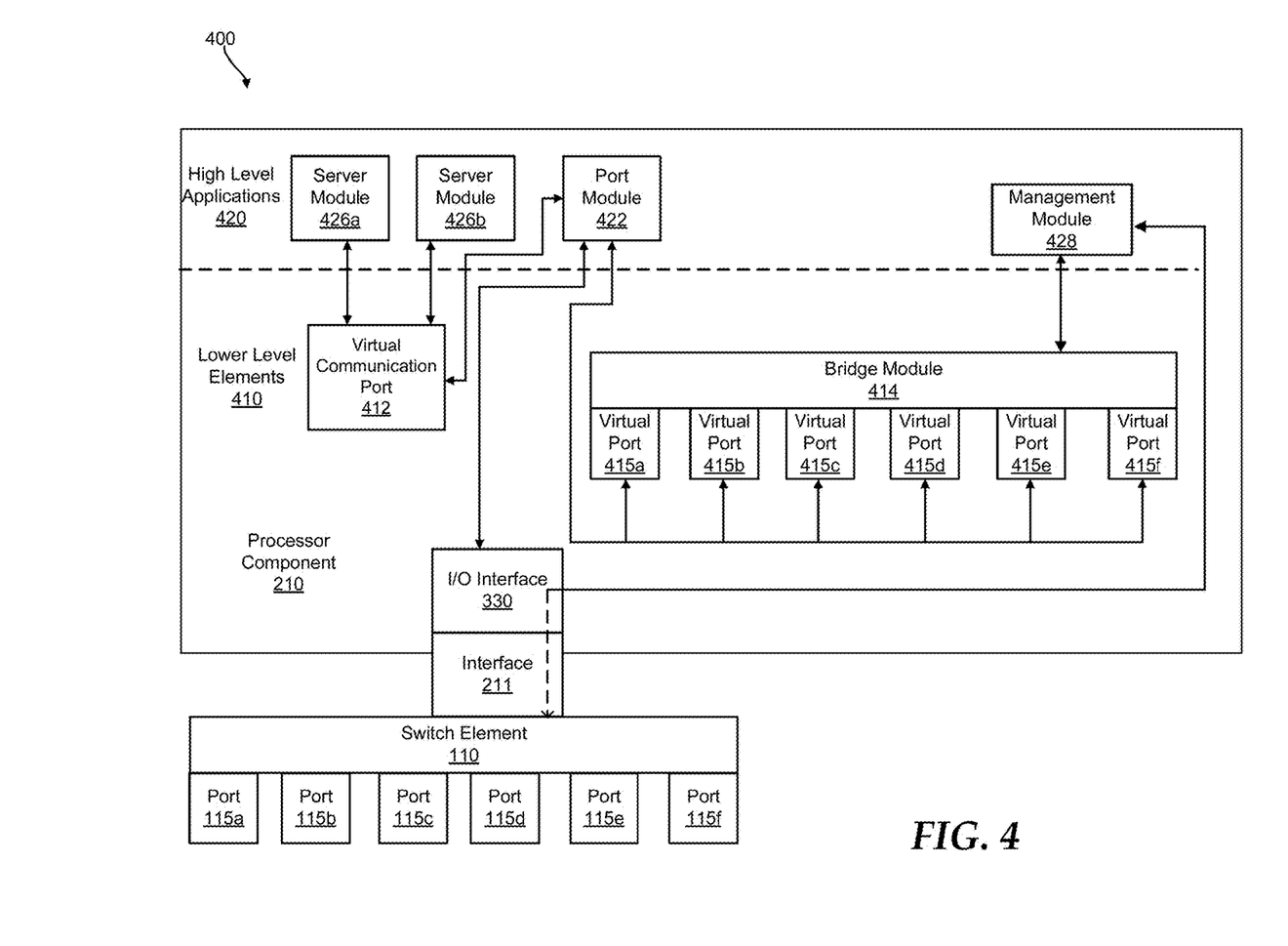
FIG. 4 is a block diagram of a switch element operating in conjunction with a processor component, according to an embodiment of the present disclosure.

FIG. 4 illustrates an embodiment of a processor switch system 400 which may be similar to system 200 of FIG. 2. The description of elements of system 200 holds for the same designated elements of system 400. As illustrated in FIG. 4, processor component 210 is running a set of high level applications 420 and a set of lower level elements 410. High level applications 420 include port module 422, server modules 426a, 426b, and management module 428. Lower level elements 410 include a virtual communication port 412, bridge module 414, and virtual ports 415a-415f. Bridge module 414 may be a Linux bridge or bridge driver and may be standard. This Linux bridge or bridge driver may be an open-source software module running on processor component 210 to supplement switch element 110 functionality. High level applications 420 may be user space applications, and may be both open source and closed source. Lower level elements 410 may run in kernel space; when operating a Linux system, all kernel space modules may be open source.

Virtual communication port 412 may be considered a virtualization of a physical port in I/O interface 330. Virtual ports 415a-415f can be considered virtual representations of ports 115a-115f, respectively, of switch element 110. For example, virtual port 415a corresponds to and represents port 115a in processor component 210. Thus, virtual ports 415a-415f virtualize switch element 110 ports at processor component 210. Bridge module 414 interfaces with virtual ports 415a-415f to provide management functionality. For example, bridge module 414 may instantiate virtual ports 415a-415f. Management module 428 receives output from bridge module 414, and based upon the output, and may configure or change the configuration of switch element 110, thereby providing management functionality. For example, management module 428 may send commands to configure switch element 110 to switch element 110 over a SMI interface of interface 211. If a spanning tree algorithm implemented on bridge module 414 with respect to virtual ports 415a-415f detects a network loop, then management module 428 may configure registers of switch element 110 to eliminate the network loop.

In the case of bridge module 414 being a Linux kernel bridge driver, management module 428 may monitor (netlink) notifications from bridge module 414. In response to the notifications, management module 428 may configure switch element 110 spanning tree registers to match the state of virtual ports 415a-415f. For example, if bridge module 414 puts a virtual interface into blocking mode, management module 428 will put the (corresponding) physical interface (of switch element 110) into blocking mode.

Still further, management module 428 may have further functionality. For example, management module 428 may monitor port state changes on physical switch ports 115a-115f, and mirror the changes on virtual ports 415a-415f. If a physical port loses a link, the management module 428 will mirror the loss of link on the corresponding virtual port. Bridge module 414 may then send topology change notifications so that shortest paths can be recalculated for nodes.

Server modules 426a and 426b are in communication with virtual communication port 412 and may provide server configuration functionality to, for example, a user. For example, server modules 426a and 426b may be standard unmodified TCP/IP and UDP/IP socket based applications. Port module 422 communicates packets between ports. Port module 422 may be operable to communicate packets with virtual communication port 412 and each of virtual ports 415a-415f. Still further, port module 422 may be operable to communicate packets with I/O interface 330 to communicate packets with switch element 110 via interface 211. For example, as discussed above, interface 211 may include an MII operable to communicate packets and port module 422 may communicate packets over the MII with switch element 110, and through switch element 110 with a larger network generally.

During operation of system 400, and when switch element 110 is in a management mode, packets to be routed to processor component 210 (from switch element 110) over interface 330 are tagged with an indication of the port of switch element 110 (as illustrated in FIG. 4, one of ports 115a-115f) the packet is received on by switch element 110 and the FCS of the packet before switch element 110 appended the tag may also be included in the tag data. Processor component 210 may not receive all packets that flow between ports 115a-115f of switch element 110; rather, for example, processor component 210 receives the subset of packets necessary to perform management functions such as spanning tree and LLDP functionality for ports 115a-115f. For example, reserved multicast packets, broadcast packets, and packets addressed to the processor component 210 Media Access Control (MAC) address are tagged and routed to processor component 210. The remaining packets not routed to processor component 210 are routed with switch element 110 without transfer to processor component 210. Generally, routing at switch element 110 without transferring a packet to processor component 210 is more efficient with regard to packet routing, so it is desired to limit the packet classes and packets forwarded to processor component 210.

As discussed above, these limited sets of packets forwarded to processor component 210 may include reserved multicast packets, broadcast packets, and packets addressed to the processor component 210 MAC address. As discussed above, these packets are tagged with the arrival port (one of ports 115a-115f) by switch element 110 when switch element 110 is in a management mode.

Because tagging changes the format of the tagged packets to a non-standard format, open source or other software components operable with a standard packet format may be inherently unable to process tagged packets. Port module 422 may format tagged and untagged packets to allow for different modules, ports or elements to process packets and then route packets to the correct module, port or element. In a sense, then, port module 422 acts as a converter or interpreter, converting tagged packets into untagged packets so that the packets may be processed by an open source module, for example an open source bridge module, and converting untagged packets into tagged packets so that the packets may be processed by switch element 110 when switch element 110 is in management mode and configured to process tagged packets received from interface 211.

Port module 422 receives tagged packets from I/O interface 330, and separates and routes the packets between virtual communication port 412 and virtual ports 415a-415f based on the packet tags. For example, multicast and broadcast packets are routed to virtual communication port 412, whereas reserved multicast packets are routed to virtual ports 415a-415f based on the corresponding port (one of ports 115a-115f) indicated in the packet tag. Such reserved multicast packets may be STP or LLDP packets. Virtual communication port 412 may be uncoupled from bridge module 414 to avoid packets routed through virtual communication port 412 being replicated by bridge module 414.

More specifically, port module 422 receives tagged packets from I/O interface 330, and routes the reserved multicast class of packets to virtual ports 415a-415f, removing tags prior to routing the packets to the correct respective virtual port 415, based on the port 115 specified in the tag. Removal of the tags by the port module 422 prior to forwarding on the packets enables open source software receiving the packets to process the packets. Conversely, port module 422 receives untagged packets from bridge module 414 via virtual ports 415a-415f and routes the packets to the corresponding ports 115a-115f, adding a tag or padding out the packet prior to sending the packets out interface 211 so that switch element 110 may process, for example, route the packets, when switch element 110 is in management mode and configured to process tagged packets.

To perform spanning tree management, spanning tree protocol (STP) is enabled on bridge module 414. Bridge module 414 then both sends and receives multicast packets, for example, bridge protocol data units (BPDUs), over virtual ports 415a-415f, and updates an STP state of corresponding ports 115a-115f. Management module 428 is in communication with bridge module 414 and receives STP information from bridge module 414. Based on the information received from bridge module 414, management module 428 controls switch element 110 through the SMI of interface 211 to provide management functionality. For example, STP information provided to management module 428 by bridge module 414 may indicate a network loop, and management module 428 may configure switch element 110 to eliminate the detected network loop.

More specifically, bridge module 414 implements spanning tree analysis by sending multicast packets over virtual ports 415a-415f to port module 422. These multicast packets are not tagged because bridge module 414 processes untagged packets. After receiving the multicast packets from bridge module 414, port module 422 tags the multicast packets, for example, with the corresponding port 115 corresponding to the virtual port 415 the port module received the packet from, together with the FCS, and routes the now-tagged multicast packets to switch element 110 via I/O interface 330 and the MII of interface 211. Switch element 110 in turn processes the tagged packets, and transmits the multicast packets out of the port(s) 115 specified by the tags onto a network. Since to perform spanning tree management, switch element 110 is in a management mode and operable to process tagged packets, switch element 110 will be operable to process tagged packets received from processor component 210.

Similarly, multicast packets from the network are received at ports 115a-115f, and are tagged with an indication of the receiving port 115 and the appropriate FCS by switch 110 because switch 110 is in a management mode performing spanning tree management. The tagged packets are then routed to port module 422 in processor component 210 via interface 211 and I/O interface 330. Port module 422 strips off the tags from the packets, adjusts the packets per the FCS, and forwards the packets to the virtual port 415 corresponding to the port 115 indicated by the tag(s). Bridge module 414 analyzes the untagged packets received on virtual ports 415a-415f, and determines the STP state of switch element 110 and ports 115a-115f. Bridge module 414 communicates the determined STP state to management module 428. Based upon the determined STP state, management module 428 may configure switch element 110 via I/O interface 330 and SMI of interface 211 to eliminate one or more detected loops or otherwise configure switch element 110 as desired.

Use of port module 422 as a converter or interpreter to communicate packets between diverse elements and modules allows tagged and untagged packets to be processed by diverse elements and modules, and further allows for the use of open source elements and modules unable to process tagged packets, for example an open source bridge module such as a standard Linux bridge driver. Port module 422 removes tagging from tagged packets before packets are sent to elements and modules unable to process tagged packets, and conversely port module 422 adds tagging to untagged packets before packets are sent to elements configured to processes tagged packets, for example switch element 110. As can be seen from system 400, port module 422 functionality interfaces elements configured to process tagged packets with elements and modules unable to process tagged packets.

To perform LLDP management, virtual ports 415a-415f allow for monitoring of LLDP packets in the context of switch element 110. Virtual ports 415a-415f enable system 400 to send LLDP packets out of specific ports of ports 115a-115f for creation of an accurate LLDP neighbor table. For example, bridge module 414 may send packets out one or more virtual ports 415a-415f to port module 422. Port module 422 will pad the packet frame if required, calculate the FCS of the packet and tag the packet with an indication of one of ports 115a-115f corresponding to the virtual port 415 the packet was sent on. Port module 422 will send the tagged packet to switch element 110 via interface 211, for example via MII. Switch element 110 will send the packet out of the specific port 115 of ports 115a-115f indicated by the tag onto a network.

Also, LLDP packets from the network are received at ports 115a-115f, and are tagged with the receiving port 115 and the appropriate FCS by switch 110 because switch 110 is in a management mode performing LLDP. The tagged packets are then routed to port module 422 in processor component 210 via interface 211 and I/O interface 330. Port module 422 strips off the tags from the packets, adjusts the packets per the FCS, and forwards the packets to the virtual port 415 corresponding to the port 115 indicated by the tag(s). Bridge module 414 analyzes the untagged packets received on virtual ports 415a-415f, determines LLDP neighbor devices on the network, and compiles an LLDP neighbor table. Bridge module 414 communicates the LLDP neighbor data to management module 428. Management module 428 may configure switch element 110 via I/O interface 330 and SMI of interface 211 accordingly, or transfer the LLDP neighbor table to switch element 110.

In the above described LLDP procedure(s), port module 422 removes tagging from tagged packets before packets are sent to elements and modules unable to process tagged packets, and conversely, port module 422 adds tagging to untagged packets before packets are sent to elements configured to processes tagged packets, for example switch element 110.

When packets addressed to the network address, for example, the MAC address, of the processor component 210 are received by the switch element 110 when the switch element 110 is in a management mode, the switch element 110 will tag the packets with the port(s) 115 the packet(s) are received on at the switch element 110. Therefore it may be necessary to utilize port module 422 to remove the appended tags so that the packets may be processed by modules or elements running on processor component 210. Similarly, broadcast packets received by the switch element 110 when the switch element 110 is in a management mode will be tagged with the port(s) 115 the packet(s) are received on at the switch element 110. Therefore it may be necessary to utilize port module 422 to remove the appended tags so that the packets may be processed by modules or elements running on processor component 210. Subsequent to removing the tags, port module 422 will send the untagged packets to the appropriate module or element of processor component 210, thereby acting as a converter or translator.

Conversely, when packets are sent from processor component 210 to switch element 110 while switch element 110 is in a management mode, the packets may have to be tagged to allow for processing at switch element 110 (because switch element 110 is in a mode processing tagged packets). For example, packets sent from server modules 426a and 426b to virtual communication port 412 may be untagged packets. For processing by switch element 110, virtual communication port 412 sends the (untagged) packets to port module 422, which tags the packets and adds FCS, before forwarding the now-tagged packets to switch element 110. These packets, from server modules 426a and 426b, for example, may be transmitted in a communication mode which may not be port directed or multiport directed, so switch element 110 may route these packets based on its Virtual Local Area Network (VLAN) and address tables. Thus, the tagging of these packets may not indicate a port, because port information may not be used in routing these packets originating from virtual connection port 412. A tag may contain a tag command or operation code that tells the switch to perform port directed (as in STP or LLDP) or normal routing based on VLAN routing tables.

While in system 400, six ports and six corresponding virtual ports are shown, this is by way of exposition, and any number of ports and corresponding virtual ports may be used in a system as described above, as would be understood by one of skill in the art.

Figure 5A:
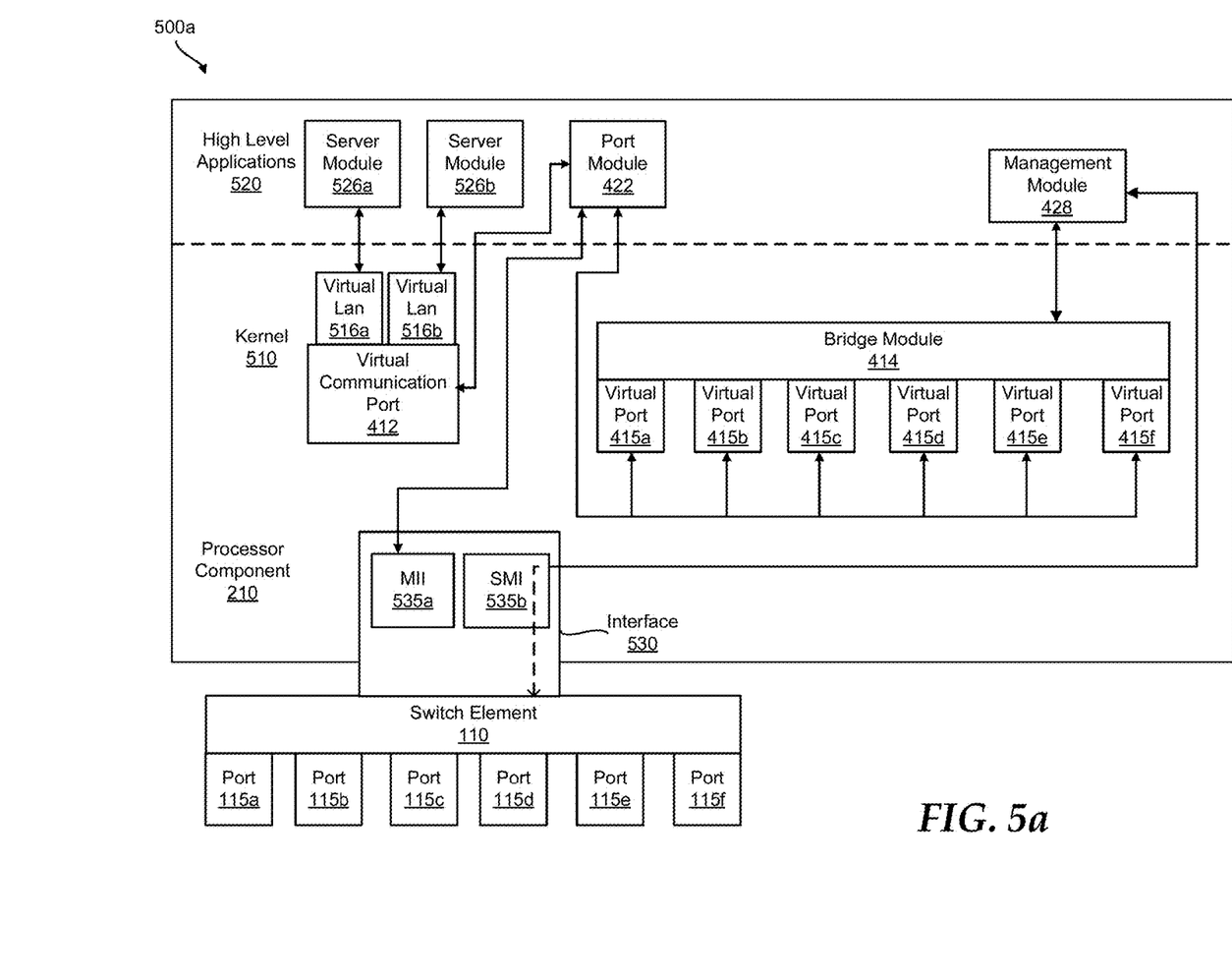
FIG. 5a is a block diagram of a switch element operating in conjunction with a processor component, according to an embodiment of the present disclosure.
Figure 5B:
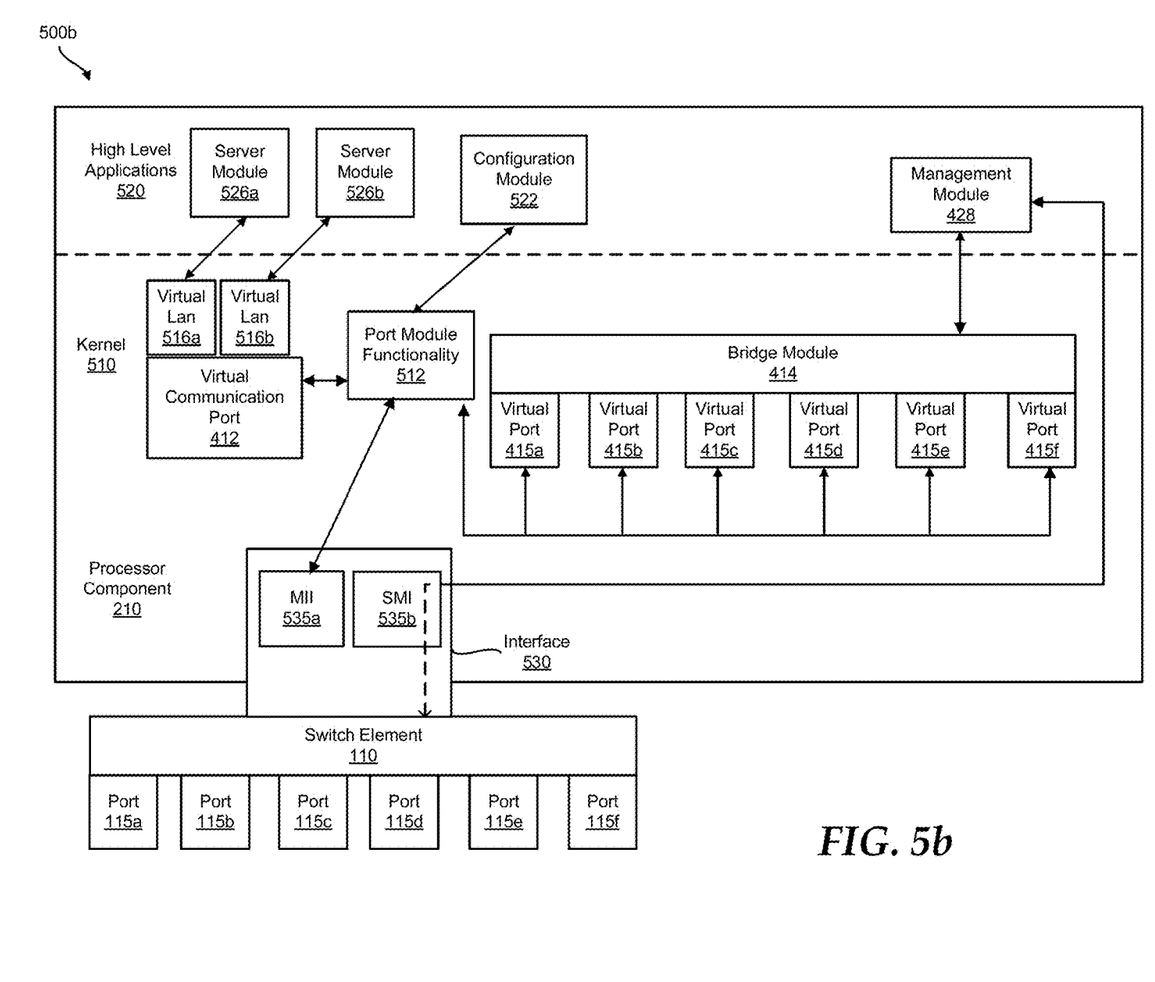
FIG. 5b is a block diagram of a switch element operating in conjunction with a processor component, according to an embodiment of the present disclosure.

FIGS. 5a and 5b illustrate further embodiments of a processor switch system, namely systems 500a and 500b, respectively, which may be similar to system 400 of FIG. 4. The description of elements of system 400 holds for the same designated elements of systems 500a and 500b.

Turning to FIG. 5a and system 500a, processor component 210 may run kernel 510 and high level applications 520 which may interface with switch element 110 via kernel 510. As would be known to one of skill in the art, a kernel is a computer program running on a processor that interfaces with higher level applications to provide functionality. Interface 530 couples switch element 110 with processor component 210 via MII 535a and SMI 535b. High level applications 520 include commercial server module 526a, proprietary server module 526b, port module 422 (described above), and management module 428 (described above). Commercial server module 526a may be analogous to server module 426a of FIG. 4, and may be a commercial or widely available server module, such as a program provided by the Apache Software Foundation of Forest Hill, Md. Proprietary server module 526*b* may be analogous to server module 426*b* of FIG. 4, and may be a proprietary server module, such as a program provided by Dell Corporation of Round Rock, Tex., for its name-brand servers.

Kernel 510 includes Virtual Locale Area Network (VLAN) 516*a* and 516*b*, virtual communication port 412 (described above), bridge module 414 (described above), virtual ports 415*a*-415*f* (described above), and interfaces MII 535*a* and SMI 535*b*. Commercial server module 526*a* is coupled to virtual communication port 412 in kernel 510 via VLAN 516*a*. Similarly, proprietary server module 526*b* is coupled to virtual communication port 412 in kernel 510 via VLAN 516*b*. MII 535*a* interfaces with port module 422 and SMI 535*b* interfaces with management module 428.

Turning to FIG. 5*b* and system 500*b*, system 500*b* is similar to system 500*a*, and description of elements of system 500*a* holds for the same designated elements of systems 500*b*. In system 500*b*, port module functionality 512 is located in kernel 510 instead of being in a higher level application. That is, the functionality of port module 422 has been relocated into kernel 510. Locating tagged and untagged packet converting or translating functionality in kernel 510 allows for inherently better performance because of, for example, the tighter integration of functionality when transferring packets.

As further shown in FIG. 5*b*, configuration module 522 is in communication with port module functionality 512, and configuration module 522 may be used to configure port module functionality 512 in kernel 510. In embodiments, interface 530 may be an I/O module in kernel 510 for more efficient data transfer.

Figure 5C:
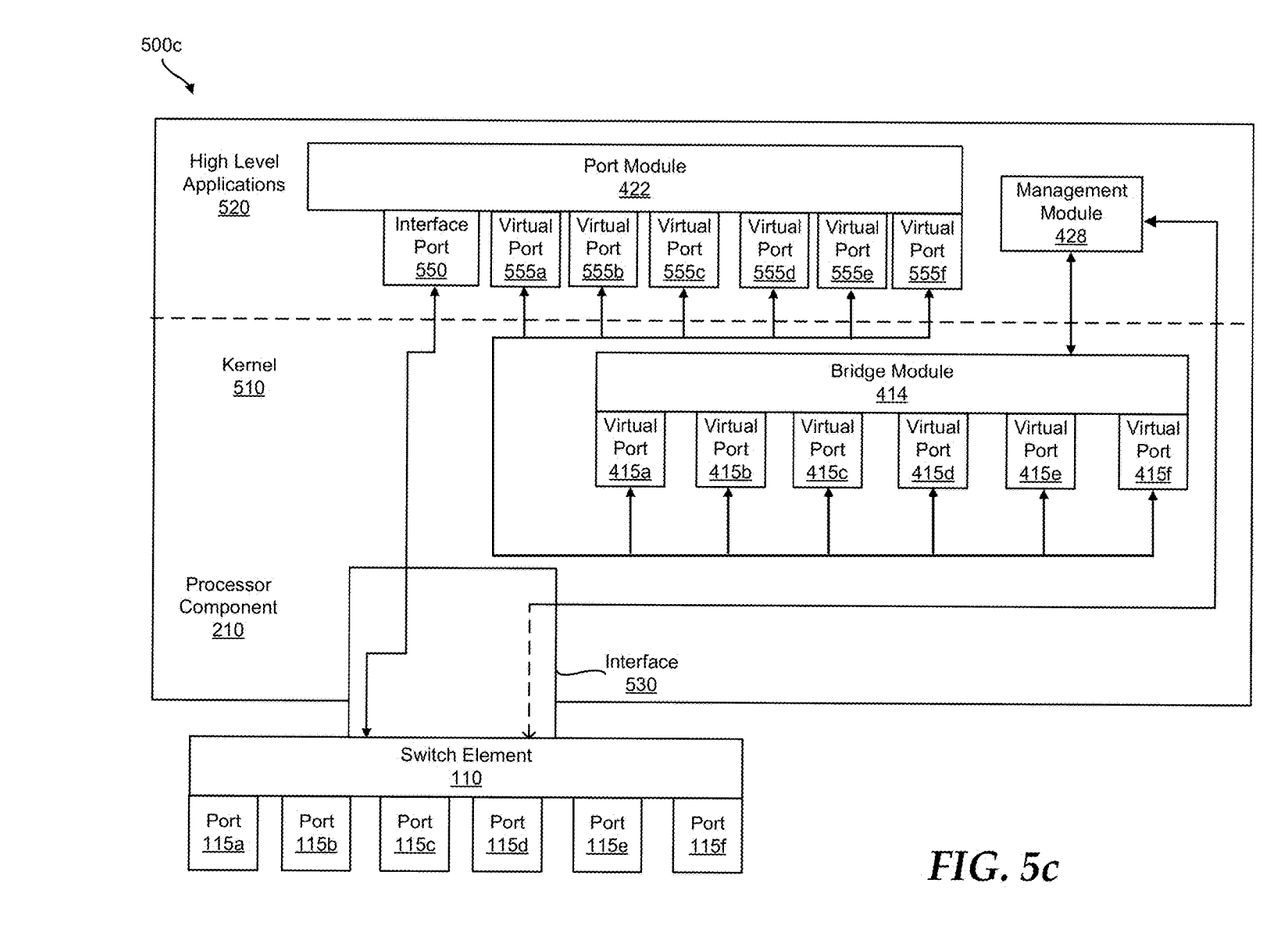
FIG. 5c is a block diagram of a switch element operating in conjunction with a processor component, according to an embodiment of the present disclosure.

FIG. 5*c* illustrates further embodiments of a processor switch system, namely system 500*c*, which may be similar to system 500*a* of FIG. 5*a*. The description of elements of system 500*a* holds for the same designated elements of system 500*c*. In system 500*c*, interface 530 may be a PCI interface, and may operate in kernel space. An implementation of port module 422 is illustrated in FIG. 5*c*. Port module 422 may have an interface port 550 providing an interface for switch element 110, and may be logically coupled thereto. Furthermore, port module 422 may have a set of virtual ports 555*a*-555*f* corresponding to virtual ports 415*a*-415*f* of bridge module 414, and coupled thereto.

Figure 6A:
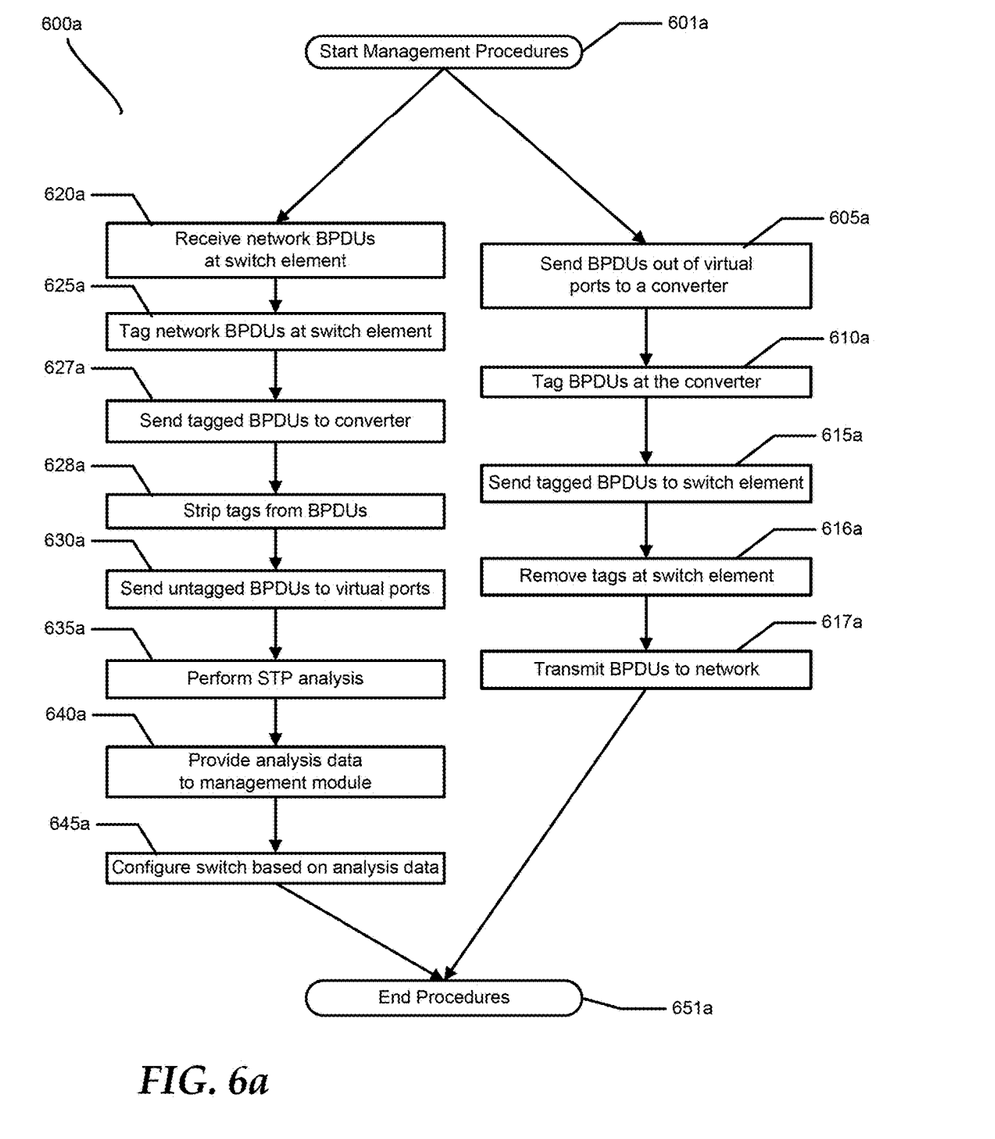
FIG. 6a is a flow chart of a method of providing management functionality, according to an embodiment of the present disclosure.

FIG. 6*a* is a flowchart of a method 600*a* of providing management functionality, specifically STP functionality. According to the spanning tree protocol, network devices periodically broadcast a respective state by periodically transmitting BPDUs onto the network. At 601*a*, a switch element in a management mode begins management procedures providing STP functionality, thereby beginning method 600*a*. In management mode, the switch element will tag received packets. At 605*a*, a bridge with instantiated virtual ports representing physical ports sends BPDUs out of the virtual ports to a packet converter. The packet converter adds tags to the BPDUs at 610*a*. The respective tag applied to a BPDU indicates the virtual port (or the physical port corresponding to the virtual port) the BPDU is transmitted on. At 615*a*, the packet converter sends the tagged BPDUs to the switch element. The switch element removes the tags from the BPDUs at 616*a*, and, at 617*a*, transmits the BPDUs to the network on the ports indicated by the respective tag of the BPDUs.

Method 600*a* further includes 620*a* to 645*a* which are performed when the switch element is in management mode, and which are performed asynchronous to 605*a* to 617*a*. At 620*a*, the switch element receives network BPDUs. That is, network BPDUs are received by the switch element at 620*a*. Then the received BPDUs are tagged at 625*a* by the switch since the switch is in a management mode providing STP functionality. The respective tag applied to a BPDU indicates the port (or the virtual port corresponding to the port) the BPDU is received on. At 627*a*, the switch sends the received and tagged BPDUs to the packet converter. At 628*a*, the packet converter strips off the tag and otherwise returns the BPDUs to the untagged state. To implement this, the packet converter may use the respective FCS of a tag, if available. At 630*a*, the packet converter sends the untagged BPDUs to the virtual ports corresponding to the port indicated in the tag of the respective BPDU.

At 635*a*, the bridge receives the untagged network BPDUs on the virtual ports and performs STP analysis using the BPDUs. The bridge then provides the STP analysis data to a management module at 640*a*. At 645*a*, the management module configures the switch element based on the analysis data. For example, the management module may configure the switch to eliminate one or more loops indicated by the analysis data. At 651*a*, the configured switch ends procedures, and method 600*a* ends.

Figure 6B:
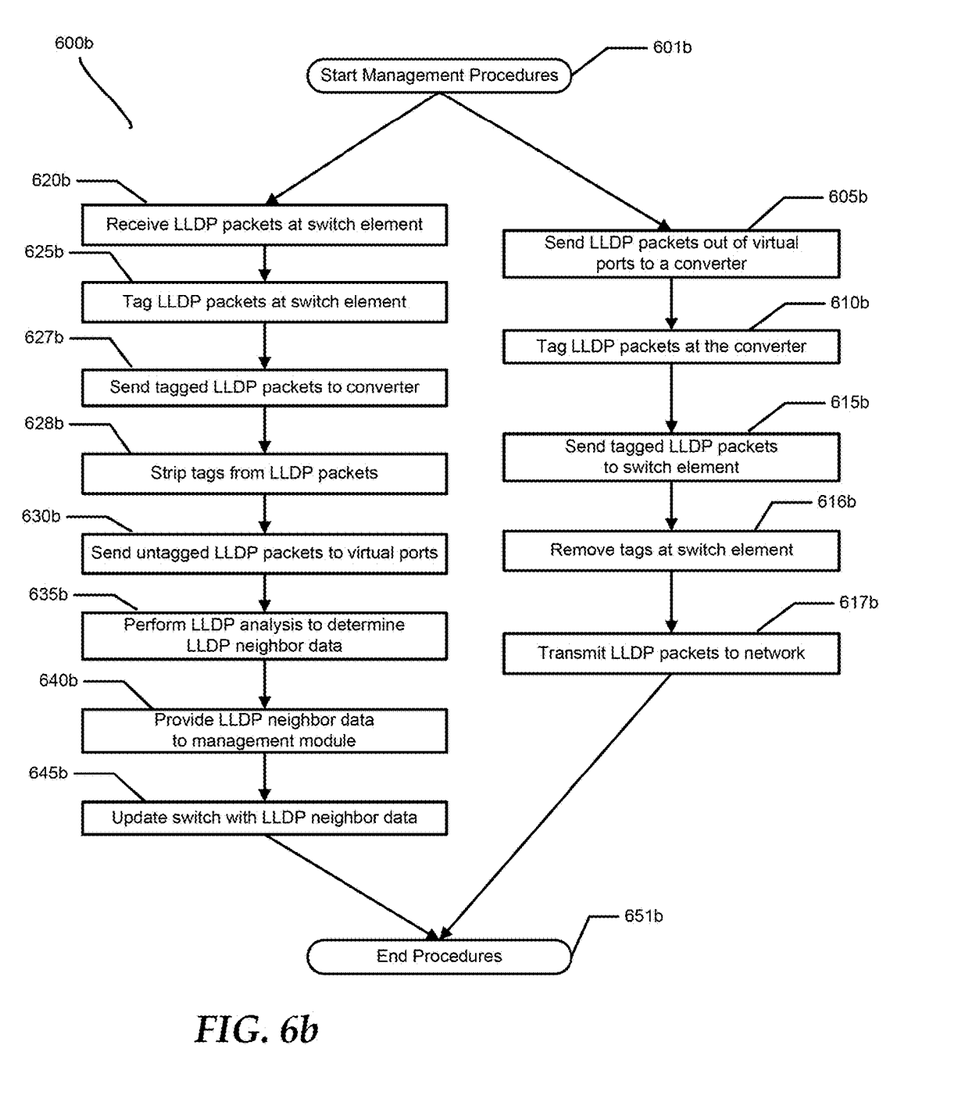
FIG. 6b is a flow chart of a method of providing management functionality, according to an embodiment of the present disclosure.

FIG. 6*b* is a flowchart of a method 600*b* of providing management functionality, specifically LLDP functionality. LLDP devices on a network transmit LLDP packets periodically on the network per the LLDP standards. These LLDP transmissions by network devices may be asynchronous. At 601*b*, a switch element in a management mode begins management procedures providing LLDP functionality and begins to tag packets received from the network with the incoming port and FCS, thereby beginning method 600*b*. At 605*b*, a bridge with instantiated virtual ports representing physical ports sends LLDP packets out of the virtual ports to a packet converter. The packet converter adds tags to the LLDP packets at 610*b*. The tags may indicate a transmission port. At 615*b*, the packet converter sends the tagged LLDP packets to the switch element. The switch element removes the tags from the LLDP packets at 616*a*, and, at 617*a*, transmits the LLDP packets to the network on the ports indicated by the respective tag of the LLDP packet.

Method 600*b* further includes 620*b* to 645*b* which are performed when the switch element is in management mode, and which are performed asynchronous to 605*b* to 617*b*. At 620*b*, the switch element receives (untagged) LLDP packets from the network. That is, LLDP packets sent over the network by network devices according to the LLDP protocol are received by the switch element at 620*b*. Then the received LLDP packets are tagged at 625*b* with an indication of the receiving port by the switch since the switch is in a management mode providing LLDP management functionality. At 627*b*, the switch sends the received and tagged LLDP packets to the packet converter. At 628*b*, the packet converter strips off the tag and otherwise returns the LLDP packets to the untagged state. To implement this, the packet converter may use the respective FCS of a tag, if available. At 630*b*, the packet converter sends the untagged LLDP packets to the virtual ports corresponding to the port indicated in the tag of the respective LLDP packet.

At 635*b*, the bridge receives the untagged LLDP packets on the virtual ports and performs LLDP analysis of neighboring LLDP devices on the network using the packets to compile an LLDP neighbor table. The bridge then provides LLDP neighbor table data to a management module at 640*b*. At 645*b*, the management module updates the switch element with LLDP neighbor data. For example, the management module may send the complied LLDP neighbor table to the switch where it may be used for routing. At 651*b*, the switch ends procedures, and method 600*a* ends.

Embodiments described herein bridge the gap between proprietary switch hardware and open source software. For example, one or more software modules allow for use of a switch in management mode with open source software running on a processor.

Elements and modules described herein may be stored on a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

An information handling system comprising embodiments of a processor switch system such as described above can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, ARM embedded processor (such as that provided by ARM Holdings PLC, of Cambridge, England), or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system for a network, the information handling system comprising:
   a switch element having a set of ports; and
   a processor component coupled to the switch element via an interface and supporting an execution of a first module with a set of virtual ports corresponding to the set of ports to provide a respective virtual port for each port of the set of ports and a tag module logically interposed between the switch element and the first module, wherein the information handling system is configured to:
   receive a set of network packets at the switch element via the set of ports;
   append tags to network packets of the set of network packets at the switch element to generate tagged network packets, each tag indicating a respective port of the set of ports corresponding to a network packet and a bit length of the network packet prior to appending a corresponding tag;
   send the tagged network packets to the tag module;
   remove the tags from the tagged network packets at the tag module to generate untagged network packets;
   send the untagged network packets to virtual ports of the set of virtual ports; and
   perform management analysis of the untagged network packets received on the virtual ports at the first module.

2. The information handling system of claim 1, the processor component configured to provide management analysis data to a management module and control the switch element via the management module based on the management analysis data.

3. The information handling system of claim 1, wherein the first module is an open source module and unable to process the tagged network packets.

4. The information handling system of claim 3, wherein the first module is a Linux bridge.

5. The information handling system of claim 1, wherein the switch element removes tags from the tagged network packets prior to transmission via the network.

6. The information handling system of claim 1, wherein the switch element transmits a first packet via a port of the set of ports.

7. The information handling system of claim 1, wherein the tag module addresses a first network packet of the set of network packets to the respective virtual port.

8. The information handling system of claim 1, wherein the interface comprises a packet transmission interface for transmitting the network packets between the switch element and the processor element.

9. A method comprising:
executing, by a processor associated with a switch element, a first module establishing a set of virtual ports corresponding to a set of ports of the switch element, wherein the set of virtual ports provides a virtual representation of the set of ports and a respective virtual port represents a corresponding port;
receiving, by the processor, packets via virtual ports of the set of virtual ports;
appending, by the processor, tags to the packets to generate tagged packets each tag associating a corresponding packet of the packets to a virtual port of the virtual ports and to a bit length of the corresponding packet prior to the appending of a corresponding tag; and
sending, by the processor, the tagged packets to the switch element for routing via the set of ports;
receiving by the processor, the tagged packets via the switch element;
removing, by the processor, the tags from the tagged packets to generate untagged packets;
sending, by the processor, the untagged packets to a destination via a network; and
performing, by the processor, management analysis of the tagged packets.

10. The method of claim 9, further comprising providing management analysis data to a management module and controlling the switch element via the management module based on the management analysis data.

11. The method of claim 9, wherein the first module is an open source module and unable to process the tagged packets.

12. The method of claim 11, wherein the first module is a Linux bridge.

13. The method of claim 9, wherein the removing of the tags from the tagged packets is performed prior to the sending of the untagged packets via the network.

14. The method of claim 9, wherein the switch element transmits a first untagged packet of the untagged packets via the network.

15. The method of claim 9, further comprising routing the tagged packets according to the tags.

16. A switching system for a network, the switching system comprising:
a switch element with a set of ports, the switch element configured to append a tag to a packet received via a port of the set of ports, the tag indicating the port and a bit length of the packet prior to appending the tag;
a processor element coupled to the switch element via an interface and supporting execution of a first module with a set of virtual ports corresponding to the set of ports and configured to perform management analysis, wherein the set of virtual ports provides a virtual representation of the set of ports; and
a bridge module executed by the processor element, the bridge module interfacing with the set of virtual ports to detect a network loop in the switch element.

17. The switching system of claim 16, wherein the bridge module implements a spanning tree algorithm to detect the network loop.

18. The switching system of claim 16, wherein the processor element configures a register in the switch element to eliminate the network loop.

19. The switching system of claim 16, wherein the switch element removes the tag appended the packet.

20. The switching system of claim 16, wherein the switch element appends the tag to packet with the tag indicating a virtual port of the set of virtual ports.

* * * * *